(12) United States Patent
Kuan et al.

(10) Patent No.: US 12,291,822 B2
(45) Date of Patent: May 6, 2025

(54) CURB POWER SOURCE

(71) Applicants: Terreform ONE, Brooklyn, NY (US);
Axel Kilian, Cambridge, MA (US)

(72) Inventors: Vivian Kuan, New York, NY (US);
Mitchell Joachim, New York, NY (US); Axel Kilian, Cambridge, MA (US)

(73) Assignee: Terreform ONE, Brooklyn, NY (US)

( * ) Notice: Subject to any disclaimer, the term of this patent is extended or adjusted under 35 U.S.C. 154(b) by 360 days.

(21) Appl. No.: 17/578,165

(22) Filed: Jan. 18, 2022

(65) Prior Publication Data

US 2022/0228324 A1 Jul. 21, 2022

Related U.S. Application Data

(60) Provisional application No. 63/139,151, filed on Jan. 19, 2021.

(51) Int. Cl.
*H02G 9/10* (2006.01)
*E01C 11/22* (2006.01)

(52) U.S. Cl.
CPC ............. *E01C 11/223* (2013.01); *H02G 9/10* (2013.01)

(58) Field of Classification Search
CPC .... H02G 9/04–10; H02G 3/0493; H02G 3/04; B60L 53/31; E01C 11/223; E01C 11/227; E01C 11/222; E01C 11/22; E01C 15/00; Y02T 10/70; Y02T 10/7072; E04C 1/39; E04C 1/397
USPC .......................................................... 174/39
See application file for complete search history.

(56) References Cited

U.S. PATENT DOCUMENTS

| | | | |
|---|---|---|---|
| 3,600,773 A * | 8/1971 | Davis | E01C 19/4893 |
| | | | 425/173 |
| 9,016,976 B2 | 4/2015 | Dixon | |
| 2002/0122697 A1* | 9/2002 | Hirschhorn | E01C 19/506 |
| | | | 405/303 |
| 2009/0208286 A1 | 8/2009 | Sutton | |
| 2013/0121761 A1 | 5/2013 | Dixon | |
| 2017/0197517 A1* | 7/2017 | Jamieson | B60L 53/14 |
| 2020/0156492 A1 | 5/2020 | Mackenzie | |

FOREIGN PATENT DOCUMENTS

| | | |
|---|---|---|
| DE | 10 2010 046 263 A1 | 3/2012 |
| DE | 102016225134 A1 | 6/2018 |
| DE | 10 2020 205 561 A1 | 11/2021 |

(Continued)

OTHER PUBLICATIONS

Sutton (WO 20211156621 A2) provided with Office Action (Year: 2021).*

(Continued)

*Primary Examiner* — Roshn K Varghese
(74) *Attorney, Agent, or Firm* — Morrison & Foerster LLP

(57) ABSTRACT

The present disclosure is directed to a curb for providing electricity to one or more devices on a street or a sidewalk. The curb includes a rigid curb housing for storing at least one power source or power source connector configured to be electrically coupled to a power source. The curb additionally includes a top plate removably attached to the rigid curb housing, the top plate configured to electrically couple at least one power outlet to the at least one power source or power source connector.

17 Claims, 2 Drawing Sheets

(56) References Cited

FOREIGN PATENT DOCUMENTS

| EP | 2248759 A2 | 8/2010 | |
|---|---|---|---|
| GB | 2591830 A | 8/2021 | |
| WO | WO-2021156621 A2 * | 8/2021 | ............. B60L 53/12 |
| WO | 2021/250427 A1 | 12/2021 | |

OTHER PUBLICATIONS

International Search Report and Written Opinion mailed Apr. 14, 2022, directed to International Application No. PCT/US2022/70222; 16 pages.

Supplementary European Search Report dated Oct. 23, 2024, directed to EP Application No. 22743406.5; 13 pages.

* cited by examiner though CURB POWER SOURCE

CROSS REFERENCE TO RELATED APPLICATIONS

This application claims the priority of U.S. Provisional Application No. 63/139,151, filed Jan. 19, 2021, the entire contents of which is incorporated herein by reference.

FIELD OF THE DISCLOSURE

This disclosure relates to curbs and applications for said curbs. More particularly, this disclosure relates to curbs that provide electricity to one or more devices on a street or a sidewalk.

BACKGROUND

Curbs are typically installed at the perimeter of a street to delineate the edge of the street from a sidewalk or street median adjacent to the street. A curb may enhance safety by redirecting low-speed motor vehicle traffic; may provide structural support to the street pavement; may reduce erosion risk by channeling runoff water from rain or melted snow into storm drains; may alert a pedestrian to stop or slow down as they approach the street; and/or may enhance an aesthetic appeal of the street. Traditional curbs are made of materials including asphalt, stone or masonry blocks, and concrete. In addition, these traditional curbs are solid rather than hollow.

SUMMARY

Currently, there is no safe, efficient way to distribute power to devices on a street or sidewalk. In suburban and rural areas, power is usually transmitted to buildings or streetlights via overhead power lines, and in urban areas or environmentally sensitive areas, power is usually transmitted to buildings or streetlights via underground power lines. While the space in which to run power lines has not risen (e.g., in cities, the space in which to run power lines is often limited by preexisting underground pathways), the need to power devices located outdoors has risen—increasing demand from new outdoor power consumption devices (e.g., lighting for outdoor restaurants, electric vehicles, and smart devices such as augmented reality headsets) has been coupled with demand from traditional power consumption devices (e.g., food tucks, cameras for film crews, construction equipment, billboards, and machinery for agriculture systems). Further, the demand from indoor power consumption devices (e.g., cooling and heating systems, home appliances, computers, and electric lights) has risen along with the increasing demand from outdoor power consumption devices.

Thus, electrically charging/powering a device (e.g., a vehicle) on a street or sidewalk currently can only be achieved in a limited capacity, and is usually achieved by running a cable from a building to the device. However, this method of charging/powering a device may be inefficient and/or infeasible in areas in which no buildings or few buildings are present; may result in safety concerns in areas in which traffic—whether pedestrian or vehicle—must frequently cross; and may result in costly code violations, fire hazards, and/or weather damage to the unprotected cable. Additionally, alternative methods to charge devices located outdoors, such as wireless charging, are very costly and are very inefficient, such that widespread adoption would require the work of tens, hundreds, or thousands of new power plants around the world.

Accordingly, Applicant has developed a curb that provides electricity to one or more devices on a street or sidewalk. Specifically, Applicant has developed a curb that is configured to electrically couple at least one power outlet located on a street-level or sidewalk-level to at least one power source or power source connector housed within the curb.

According to some embodiments, a curb for providing electricity to one or more devices on a street or a sidewalk is provided, the curb comprising: a rigid curb housing for storing at least one power source or power source connector configured to be electrically coupled to a power source; and a top plate removably attached to the rigid curb housing, wherein the top plate is configured to electrically couple at least one power outlet to the at least one power source or power source connector.

According to some embodiments, the rigid curb housing comprises a front side, a back side, and a bottom side.

According to some embodiments, the rigid curb housing comprises at least one aperture on its top side.

According to some embodiments, a longitudinal direction of the at least one aperture extends in a longitudinal direction of the curb.

According to some embodiments, a portion of the top plate is configured to fit within the at least one aperture, such that the top plate encloses a portion of the top side of the rigid curb housing corresponding to the at least one aperture when attached.

According to some embodiments, the top plate is removably attached to the top side of the rigid curb housing via at least one fastener.

According to some embodiments, the top plate comprises at least one indentation configured to electrically couple the at least one power outlet to the at least one power source or power source connector.

According to some embodiments, each of the one or more devices is connected to a power outlet included in the at least one power outlet.

According to some embodiments, the at least one power outlet is comprised within a power station.

According to some embodiments, a portion of the power station is configured to fit within an indentation of the top plate.

According to some embodiments, the power station is removably attached to the top plate via at least one fastener.

According to some embodiments, the at least one indentation is configured to electrically couple a respective at least one power outlet to the at least one power source or power source connector.

According to some embodiments, a first indentation is configured to electrically couple at least one first power outlet to a first power source or a first power source connector, and a second indentation is configured to electrically couple at least one second power outlet to a second power source or a second power source connector.

According to some embodiments, the first indentation electrically couples the at least one first power outlet to the first power source via the first power source connector, and the second indentation electrically couples the at least one second power outlet to the second power source via the second power source connector.

According to some embodiments, the top plate comprises a light source.

According to some embodiments, the power source connector comprises a power cable.

According to some embodiments, the housing and the top plate comprise reinforced or hardened steel.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION

Applicant has developed a curb that can distribute power to devices on a street or sidewalk. The need to power devices located outdoors has risen as the need to power devices located indoors has also risen; however, the space in which to run power lines has not risen. Current solutions to deliver power to devices on a street or a sidewalk are neither scalable nor safe, as they (1) are inefficient and may require increased power generation at power plants; and/or (2) lead to increased fire hazards, tripping hazards for pedestrians, and weather damage that result from unprotected power lines. Accordingly, Applicant's curb can be configured to provide new pathways in which to distribute power to devices on a street or sidewalk. For example, Applicant's curb can distribute power from at least one power source or power source connector housed within the curb to at least one power outlet (or a set(s) of power outlets) on a street-level or sidewalk-level, and subsequently to one or more devices plugged into the power outlets. Distributing power through an electrified curb can provide a safe and efficient means to distribute power to devices on a street or sidewalk.

Figure 1:
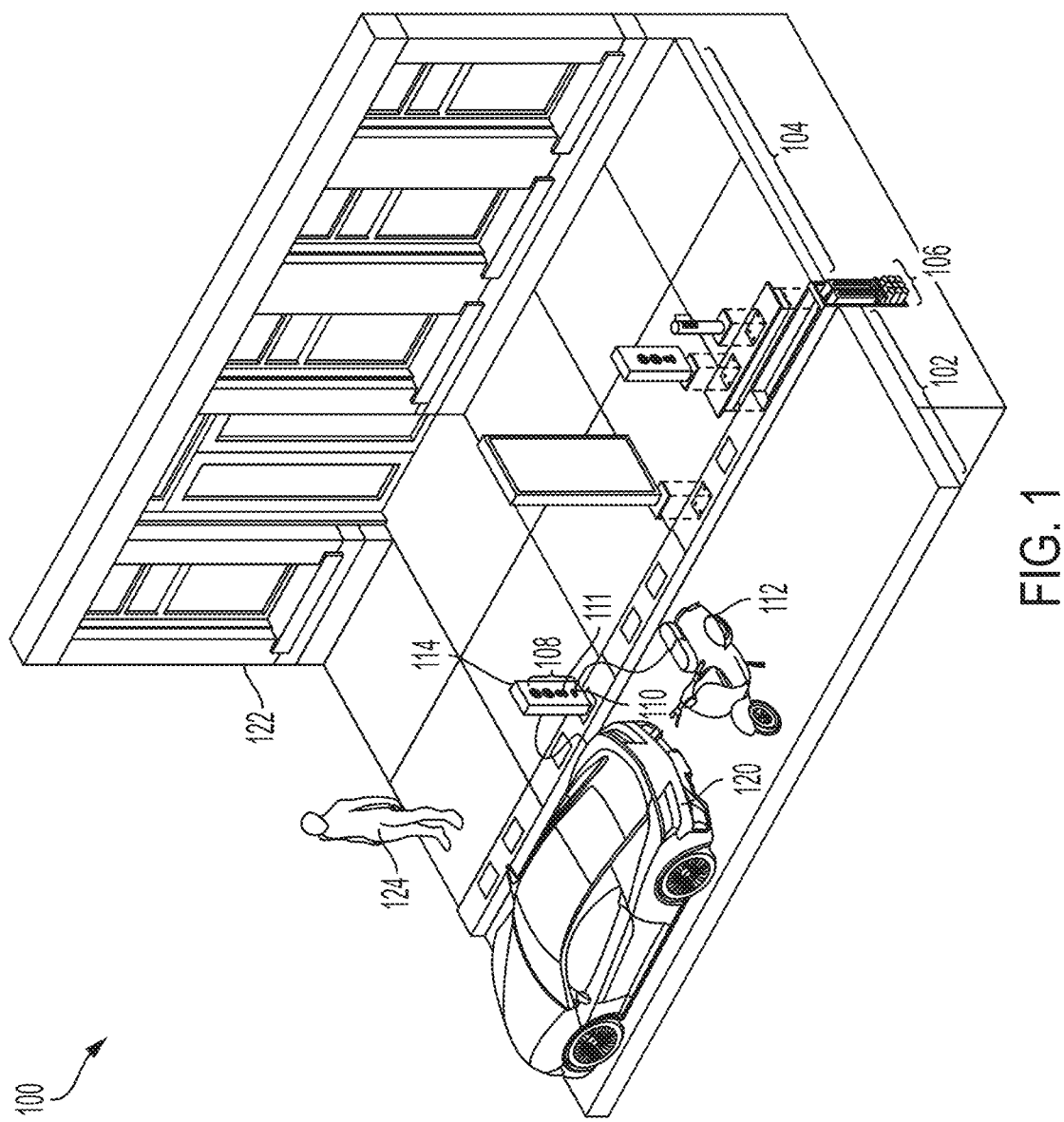
FIG. 1 provides an illustration of a segment of a street block, according to some embodiments disclosed herein.

FIG. 1 depicts an illustration of a segment of a street block 100, according to some embodiments. FIG. 1 includes an example of a street 102; a sidewalk 104; a curb 106; a power station 114 comprising at least one first power outlet 108 and at least one second power outlet 116. The at least one first power outlet 108 can comprise a first power outlet 110 and a second power outlet 111, and the at least one second power outlet 116 can comprise a first power outlet 118 and a second power outlet 119. FIG. 1 additionally includes a moped 112 connected to power outlet 110; a vehicle 120 connected to a power outlet (e.g., power outlet 118); a building 122; and a pedestrian 124.

The curb (e.g., curb 106) can provide electricity to one or more devices (e.g., moped 112 and vehicle 120) on a street (e.g., street 102) or a sidewalk (e.g., sidewalk 104). According to some embodiments, the curb can be configured to electrically couple at least one power outlets (e.g., power outlets 108) to at least one power source (e.g., a rechargeable battery, generator, etc.) or power source connector (e.g., a power cable that is electrically coupled to a power source). The curb can house the at least one power source or power source connector, and the at least one power outlet may be removably attached to a corresponding portion of the curb such that power may be distributed from the at least one power source or power source connector to the at least one power outlet. The curb may be installed adjacent to a street and/or sidewalk, such that the power outlets can be close to any device (e.g., an electric vehicle, a smart phone, a heater, and/or a projector) located near the street and/or sidewalk. Thus, a plurality of devices may be simultaneously plugged into the at least one power outlet such that they can be simultaneously charged/powered.

As shown, curb 106 can be installed between street 102 and sidewalk 104, such that the curb separates the street from the sidewalk. Curb 106 can be installed such that the curb remains rigidly fixed in the ground. For example, a foundation for the curb may be dug into the ground, and a portion of a housing for the curb may extend into the ground (e.g., to a depth of at least 3 inches, at least 6 inches, at least 9 inches, at least 12 inches, at least 15 inches, or at least 18 inches), or the curb may be fastened to at least one support beam that extends into the ground.

The dimensions of curb 106 (e.g., a length, a width, and a height of the curb) may be customized. According to some embodiments, the dimensions of the curb may be customized based on the dimensions of one or more objects (e.g., a street or a sidewalk) adjacent to the curb, and/or based on the geographic area in which the curb is installed to conform with code rules pertaining to curbs for the geographic area. Further detail regarding the curb will be provided with respect to FIG. 2.

Curb 106 can house at least one power source and/or power source connector configured to provide electricity to at least one power outlet (e.g., power outlets 108). A power source can be any power generation system (e.g., a power plant, a power generator, a battery (e.g., rechargeable battery), a wind turbine, a building power source, and/or a solar cell among others). According to some embodiments, some or all of the power may be provided by a renewable energy power source (e.g., a solar cell that harnesses solar energy, a wind turbine that harnesses wind energy, and/or a thermal pump that harnesses geothermal energy). A renewable energy power source may advantageously reduce dependency on fossil fuels, and increase air quality (e.g., by reducing dependency on diesel generators). According to some embodiments, a power source can be selected based on a requirement to provide tens, hundreds, or thousands of watts of power to the curb. A power source connector can be any connector (e.g., a power cable) configured to electrically couple a power source and at least one power outlet.

The at least one power outlet 108 can receive power from the at least one power source or power source connector, and can be used to electrically charge and/or power one or more devices. In some embodiments, a plurality of devices may simultaneously be connected to a plurality of power outlets, such that the plurality of devices simultaneously charge or are powered. The devices may be located on/near a street and/or a sidewalk adjacent to the power outlets. As shown in FIG. 1, moped 112 on street 102 is plugged into a power outlet 110; another device may simultaneously be plugged into outlet 111.

Moreover, as shown in FIG. 1, power outlets 108 may be comprised within power station 114; according to some embodiments, power station 114 may comprise at least one power outlet on each of a front side and a back side of the power station (from the perspective of a pedestrian walking in the longitudinal direction of sidewalk 104, the front side is the side closest to them and the back side is the side farthest from them). A power station that includes at least one power outlet on each of a front side and a back side can be advantageous at least because the power station may provide (1) more total outlets to consumers compared to a similarly sized power station which only comprises at least one power outlet on either a front side or a back side (this can be important especially in areas of high demand); and (2) outlets closer to a device being charged (this can be important at least to reduce power loss caused by transmitting power from an outlet to a device through a longer than needed path).

According to some embodiments, the at least one power outlet 108 can be housed within the front side of power station 114, as depicted in FIG. 1, and the at least one power outlet 116 can be housed within the back side of power station 114. For example, vehicle 120 on street 102 is plugged into an outlet (e.g., power outlet 118) of the at least one power outlet 116; similarly, another device may simultaneously be plugged into another outlet (e.g., power outlet 119) of the at least one power outlet 116. Thus, as shown in FIG. 1, power station 114 can simultaneously charge moped 112 and vehicle 120.

The segment of a street block 100 can further comprise building 122 (the façade of which is shown in FIG. 1), and pedestrian 124. As discussed above in the summary section, an alternative means to distribute power to one or more devices on a street or a sidewalk, other than via a curb power source, can involve running a cable from a building (e.g., building 122) to a device (e.g., vehicle 120). However, in addition to those reasons (e.g., inefficiencies and/or infeasibility in areas in which no buildings are present; costly code violations; fire hazards; and/or weather damage to the unprotected cable) enumerated in the summary section above, running a cable from building 122 to vehicle 120 can be disadvantageous at least because doing so poses a safety risk to pedestrian 124. For example, if walking along sidewalk 104, pedestrian 124 may easily trip over the exposed cable (especially if the sidewalk is crowded with pedestrians such that the cable is difficult to see and/or if the pedestrian is in a hurry).

Figure 2:
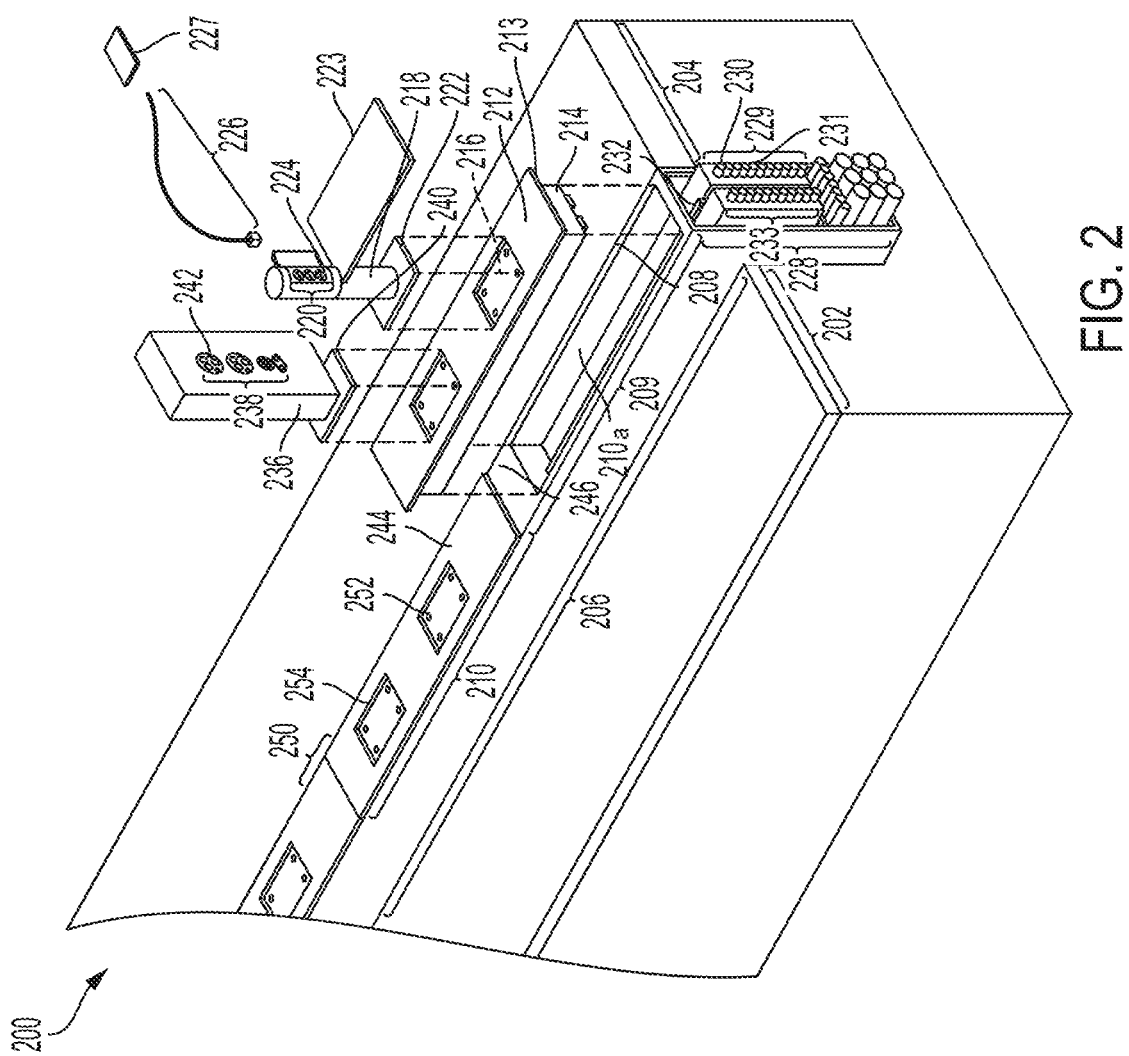
FIG. 2 provides a zoomed-in illustration of a segment of a street block, according to some embodiments disclosed herein.

FIG. 2 depicts a zoomed-in illustration of a segment of a street block 200, according to some embodiments. Street block segment 200 can include a street 202 (e.g., street 102 of FIG. 1), a sidewalk 204 (e.g., sidewalk 104 of FIG. 1), a curb 206 (e.g., curb 106 of FIG. 1), a first power station 218, and a second power station 236.

As shown in FIG. 2, curb 206 can include a housing 208. According to some embodiments, housing 208 may be configured to store at least one power source or power source connector. In some embodiments, at least one power source may be housed within the curb at least to reduce power losses caused by transmitting power over a long path. In some embodiments, at least one power source connector (e.g., a power cable that is electrically coupled to a power source) may be housed within the curb at least to provide a connection to a power source (e.g., a power plant or a wind turbine) that is not in the curb (e.g., it cannot fit within the curb). A plurality of power sources and/or a plurality of power source connectors may be housed within the curb to simultaneously distribute power to a plurality of power stations and/or power outlets, and subsequently to a plurality of devices.

According to some embodiments, housing 208 can be a rigid housing. In some embodiments, the rigid housing can be configured to be immovable and/or to serve as a barrier to low-speed motor vehicle traffic. The material composition, design, and/or dimensions of the housing may be selected to provide protection from motor vehicle traffic.

According to some embodiments, the material with which housing 208 is composed can enhance the rigidity of the housing. The rigidity of the housing can ensure safety of a power source or a power source connector within the curb. According to some embodiments, housing 208 can be composed of concrete, steel, aluminum, and/or copper. In some embodiments, steel may be selected based at least on its ability to mitigate rust, its impact resistance, and/or its ductility. According to some embodiments, housing 208 can be composed of reinforced or hardened steel. According to some embodiments, the curb housing can be designed to be in place for at least approximately 50 years before being replaced; the housing may need to be replaced due to material wear that decreases the rigidity of the curb, such that it can no longer provide adequate protection to the electrical components stored within the housing.

A height of the housing may be selected at least to serve as a barrier to motor vehicle traffic. According to some embodiments, the height of the housing (measured in a direction from the ground upward) may be at least 3 inches, at least 6 inches, at least 9 inches, at least 12 inches, at least 15 inches, or at least 18 inches above the level of street 202, such that the housing can serve as a barrier to motor vehicle traffic yet is not excessively tall such that it is unnecessarily costly to manufacture and difficult for pedestrians (e.g., pedestrian 124 of FIG. 1) to step over. Moreover, FIG. 2 shows that a front side of the housing (the side of the housing adjacent to street 202, hereinafter referred to as the "front side") can be at a right angle relative to the ground; the verticality of the front side of the housing relative to the ground, coupled with the height of the housing, can advantageously allow the housing to serve as a barrier to low-speed motor vehicle traffic. Additionally, the verticality of the front side of the housing relative to the ground advantageously (1) can provide pedestrians (e.g., pedestrian 124 of FIG. 1) with a straight step up or down, a straight step up or down being less likely to be tripped over; and (2) can enable manufacture of the curb to be easier, quicker, and cheaper (compared to if the curb were at an angle other than 90 degrees relative to the ground). In some embodiments, the curb can be at an angle other than 90 degrees relative to the ground.

The height of the housing may be customized. As shown in FIG. 2, the height of housing 208 may be configured such that the curb is flush to the level of sidewalk 204 when installed. As discussed above, according to some embodiments, the height of housing 208 may be at least 3 inches, at least 6 inches, at least 9 inches, at least 12 inches, at least 15 inches, or at least 18 inches above the level of street 202. Although shown to be uniform throughout a length of the curb (measured in a direction from left to right as viewed in FIG. 2), the height of the housing may vary. For example, the height of the housing may be decreased in one or more regions along a length of the curb to provide access to a driveway or to make it easier for pedestrians (e.g., pedestrian 124 of FIG. 1) to traverse crosswalks and other pedestrian crossings (e.g., such that the curb is just above the level of the street). Alternatively, the height of the housing may be increased in one or more regions along the length of the curb to provide greater protection from motor vehicle traffic (e.g., in areas with high pedestrian traffic and/or dangerous equipment, such as fuel pumps). According to some embodiments, the height of the housing can vary according to a gentle slope, such that when increasing in height, the curb curves up in a concave manner and when decreasing in height, the curb curves down in a convex manner.

Similarly, a width of the housing may be customized. As shown and described with respect to FIG. 2, curb 206 can be installed between a street (e.g., street 202) and a sidewalk (e.g., sidewalk 204). According to some embodiments, curb 206 can be installed between street 202 and sidewalk 204 such that housing 208 is adjacent to, but does not extend past, the street on the front side and the sidewalk on another side (hereinafter referred to as a "back side" of the housing); the width of housing 208 (measured in a direction extending from the front side to the back side of the housing) can, for example, be at least 6 inches, at least 12 inches, at least 18 inches, or at least 24 inches. The width of the housing may additionally be selected to provide sufficient storage room for the at least one power source or power source connector housed within the curb.

Although shown to be uniform throughout the length of the curb, the width of the housing may vary along the length of the curb (e.g., to widen in a region along the length of the curb which can be configured to provide access to a driveway, such that a motor vehicle may cross a sidewalk at a low speed to access the driveway; to remain adjacent to a street and a sidewalk if the street and/or the sidewalk narrows or widens; and/or to conform to code rules pertaining to the width if the rules change from one jurisdiction to another along the length of the curb).

Further, the length of the curb may be customized: the length of the curb may extend throughout only a portion of a street block, throughout an entire street block, or throughout a plurality of street blocks. A longer curb may advantageously be able to distribute power to more devices. However, a longer curb may be more difficult to manufacture and install; for example, as discussed above, the width of the housing may vary throughout the length of the curb. Moreover, a longer curb may be more costly to manufacture and install. Thus, it may be advantageous to manufacture and install the curb for only a portion of a street block (e.g., near parking spots for electric vehicles, or near an outdoor restaurant) for which device charging is most needed.

According to some embodiments, the length of the curb may be customized by designing the curb housing to be modular, such that one or more segments of the housing can be modified, added, and/or subtracted. For example, as shown in FIG. 2, housing 208 can comprise a first segment 209 and a second segment 210. In some embodiments, first segment 209 and first segment 210 are two separate housings (e.g., first housing 209 and second housing 210). Designing the curb housing to be modular can advantageously (1) increase flexibility of the length of the curb; (2) increase flexibility of the curvature of the curb; (3) reduce construction and installation time and cost; and/or (4) reduce maintenance time and cost. Each segment of the curb housing or each curb housing may be connected at one or more joints (e.g., joint 246 shown). The one or more joints can be configured to (1) provide support for the housing(s) and/or any objects placed on top of the housing(s); (2) allow for movement of housing(s) along a curve of road 202; and/or (3) allow for a cutout in the front side of housing(s) for an inlet (e.g., a storm drain).

According to some embodiments, the rigid curb housing can comprise a rigid shell. According to some embodiments, the front side (i.e., side adjacent the street), the back side (i.e., side adjacent the sidewalk), and a bottom side (i.e., side resting in and on the ground) of the housing can be enclosed by the rigid shell. For example, as shown in FIG. 2, housing 208 can be a walled shell. According to some embodiments, a thickness of a wall of the shell can be at least 0.25 inches, at least 0.5 inches, at least 1 inch, at least 1.5 inches, at least 2 inches, at least 3 inches, or at least 4 inches. The thickness of a wall of the shell may be customized based at least on (1) the need to ensure that the shell remains rigid if impacted (e.g., by a motor vehicle), such that the at least one power source or power source connector housed within the curb remains protected; and/or (2) the desire to make the shell lightweight and/or easier or cheaper to manufacture. The thickness of each wall of the shell may be uniform, as shown, or may vary depending on the side of the shell or the region along the length of the shell (e.g., the thickness of the side adjacent to the street may be greater than that of the side adjacent to the sidewalk, or the thickness of the side adjacent to the street may be increased where the street curves sharply).

According to some embodiments, the housing or rigid shell comprises at least one aperture on its top side. In some embodiments, the at least one aperture may be configured to provide access or to the at least one power source or power source connector stored in the housing. In some embodiments, the at least one aperture may be configured to store the at least one power source or power source connector housed within the curb. Storing the at least one power source or power source connector within an aperture can provide increased flexibility compared to, for example, a housing designed to fit only a specific power source or power source connector.

The dimensions of an aperture may be customized based at least on the dimensions of the segment of the curb in which it is located. As shown in FIG. 2, aperture 210a can be configured to fit within segment 209, and to take up a majority of volume of the curb segment; a larger aperture beneficially can provide more access and/or storage space for the at least one power source or power source connector, can enable the curb to be more lightweight, and can reduce material consumption. According to some embodiments, a width of aperture 210a (measured in the direction of the width of housing 208) can be at least 2 inches, at least 3 inches, at least 4 inches, at least 5 inches, or at least 6 inches; a length of aperture 210a (measured in the direction of the length of housing 208) can be at least 1 foot, at least 2 feet, at least 3 feet, at least 4 feet, or at least 5 feet; and a depth of aperture 210a (measured in the direction of the height of housing 208) can be the thickness of the shell wall or at least 3 inches, at least 6 inches, at least 9 inches, at least 12 inches, or at least 15 inches (e.g., so that the aperture extends to the ground). As shown, the longitudinal direction of aperture 210a can extend in the longitudinal direction of curb 206. The dimensions of all apertures may be the same, or one or more dimensions of one or more apertures may vary.

According to some embodiments, an aperture can be manufactured via a milling process and/or via one or more stepped-extrusions. Manufacturing an aperture may require specialized tooling. Alternatively, the tooling used to manufacture an aperture may be rapidly reconfigurable, such that a tool may be used to manufacture a wide variety of parts in addition to an aperture.

According to some embodiments, the rigid shell or housing can include at least one aperture on a longitudinal end of the shell (e.g., on its right side, as shown in FIG. 2). As shown in FIG. 2, aperture 228 can be configured to provide access to or store at least one port (e.g., port 230 or port 231) electrically coupled to a power source and/or at least one power source connector (e.g., power cable 232) electrically coupled to at least one of the plurality of ports.

Moreover, as shown in FIG. 2, aperture 228, and a corresponding section of curb 206, can extend downward beneath ground level. Aperture 228 may extend downward beneath ground level at least to increase the ease of connecting preexisting underground data cables to the ports (e.g., power is transmitted underground in many urban areas). According to some embodiments, aperture 228 and a corresponding section of curb 206 can extend downward to a depth of at least 1 foot, at least 2 feet, at least 3 feet, at least 4 feet, or at least 5 feet. According to some embodiments, the depth to which the aperture and corresponding curb section extend may be customized based at least on the depth of power lines to which the curb connects and/or the number of ports aperture 228 is configured to store.

According to some embodiments, some or each of the ports may be configured to receive power from a power source. According to some embodiments, each of the ports may receive power from the same power source. According to some embodiments, some or each of the ports may receive power from a different power source. For example, a first power line carrying power from a first power plant may be electrically coupled to port 230, and a second power line carrying power from a second power plant may be electrically coupled to port 231. The diameter of a port may be determined based at least in part on the power source it is electrically coupled to, and/or the power load it is configured to receive.

Each of the ports may be comprised within a transformer. For example, as shown in FIG. 2, port 230 and port 231 are comprised within transformer 229. A transformer may be configured to modify (e.g., to decrease ('step down') or to increase ('step up')) the power level received at the power outlet(s), based at least on the power the power outlet(s) is configured to transmit to one or more devices connected thereto; the settings of the transformer and/or the transformer used may be modified based at least in part on any modification to the power requirement of the power outlet (s). According to some embodiments, the curb comprises at least one transformer (e.g., transformer 229 and transformer 233 shown in FIG. 2); the transformer(s) may be configured such that different power outlets receive the same amount of power, or such that different power outlets receive different amounts of power.

A power source connector may be electrically coupled to a power source to distribute power received from the power source throughout the curb. For example, power cable 232 may be electrically coupled to port 230 and/or port 231 to distribute the power received at the port throughout the curb. According to some embodiments, power cable 232 can be designed to be used for approximately 10 years before being replaced; the power cable may need to be replaced due to material wear that decreases the insulation around the cable, rendering power transmission along the cable both less efficient and more dangerous.

According to some embodiments, power cable 232 may be electrically coupled to port 230, and a second power source connector (e.g., a second data cable) may be electrically coupled to port 230; a second power source connector may be included at least to transmit power received from a second power source and/or to distribute power to another region of curb 206.

According to some embodiments, a power source connector can distribute power throughout the curb by extending through one or more of the segments of the curb. For example, as shown in FIG. 2, power cable 232 can extend throughout first segment 209 of curb 206 by extending through aperture 210a; thus, aperture 210a may serve as an electrical conduit through which power is transmitted. According to some embodiments, power cable 232 may extend throughout second segment 210 in addition to first segment 209. For example, there may be a cylindrical channel within joint 246 through which power cable 232 passes; according to some embodiments, the channel may be just large enough in diameter (e.g., 0.1 inches, 0.2 inches, 0.3 inches, 0.4 inches, or 0.5 inches) such that the power cable may pass through it, but not so large that the rigidity of the curb housing is compromised.

According to some embodiments, a top plate is removably attached to a corresponding curb housing or a segment of the curb housing. According to some embodiments, a protruding portion of the top plate can be configured to fit within an aperture on the top side of the curb housing. When attached, the top plate can provide a water-tight seal to protect the at least one power source or power source connector housed within the housing by enclosing a portion of the top side of the housing corresponding to the aperture. For example, as shown in FIG. 2, top plate 212 can be configured to removably attach to housing 208, and a protruding portion 214 of top plate 212 can be configured to fit within aperture 210a. Configuring the top plate to removably attach to the curb housing can be advantageous for at least 2 reasons: (1) it can provide greater accessibility to the at least one power source or power source connector housed within the curb (e.g., to perform maintenance and/or to modify the power source or power source connector being used); and/or (2) it can provide greater flexibility to swap out a top plate with a different top plate (e.g., to replace a top plate that has been damaged and/or to replace a top plate with a top plate that is configured differently).

A top plate may removably attach to the curb housing in a number of ways. For example, similar to a manhole cover, the top plate may be locked in place and composed of a very heavy, strong material such that the plate is difficult to remove for unauthorized people without suitable tools. According to some embodiments, the top plate removably attaches to the top side of the housing via at least one fastener. A fastener may include any variation of a removable securing device, such as nuts and bolts, screws, pins, nails, any combination thereof, and/or the like. According to some embodiments, the top plate removably attaches to the curb housing via a press fit between the protruding portion of the plate and an aperture on the top side of the curb housing; to remove the top plate without causing damage to the plate, the plate may be cooled (e.g., below the freezing point of the material with which the plate is made) to allow it to shrink.

According to some embodiments, the dimensions of a top plate may be customized based at least in part on the dimensions of the aperture within which a portion of the top plate is configured to fit and/or the dimensions of the segment of the curb upon which a portion of the top plate is configured to rest. As shown in FIG. 2, the length and width of top portion 213 of top plate 212 can be selected based on the length and width of segment 209, and the length, width, and depth of protruding portion 214 of top plate 212 can be selected based on the length, width, and depth of aperture 210a (all measurements made along the same directions as the corresponding length, width, and height measurements of housing 208).

The depth of top portion 213 of top plate 212 may be selected to ensure the rigidity of the top plate, while minimizing the weight of the plate and the cost to manufacture the plate; the depth of protruding portion 214 of top plate 212 may be selected to ensure that the plate is securely attached to the housing, but that there is still room in aperture 210a underneath top plate 212 in which to store the at least one power source or power source connector. According to some embodiments, the depth of top portion 213 can be at least 0.25 inches, at least 0.5 inches, at least 1 inch, at least 1.5 inches, or at least 2 inches. According to some embodiments, the depth of protruding portion 214 can be one-eighth the depth of aperture 210a, one-quarter the depth of aperture 210a, one-half the depth of aperture 210a, or three-quarters the depth of aperture 210a.

As shown in FIG. 2, the length and width of protruding portion 214 of top plate 212 can approximately match (i.e., may be slightly different depending on the assembly method (e.g., press fit vs clearance fit)) the length and width of aperture 210a; this can advantageously allow for a secure attachment to the housing. The length of top portion 213 may be determined according to Equation 1 and the width of top portion 213 may be determined according to Equation 2.

$$L_{213} = L_{210} + T_{208} + L_{246}/2 \quad \text{Eq. 1}$$

where $L_{213}$ represents the length of top portion 213, $L_{210}$ represents the length of aperture 210a, $T_{208}$ represents the thickness of a wall of housing 208, and $L_{246}/2$ represents one-half the length of joint 246.

$$W_{213} = W_{210} + 2*T_{208} \quad \text{Eq. 2}$$

where $W_{213}$ represents the width of top portion 213, $W_{210}$ represents the width of aperture 210a, and $2*T_{208}$ represents twice the thickness of a wall of housing 208.

According to some embodiments, protruding portion 214 can be a solid block of material. According to some embodiments, protruding portion 214 can be hollow, such that the at least one power source or power source connector within curb segment 209 can be housed within protruding portion 214. In these embodiments, the thickness of one or more walls of protruding portion 214 may be at least 0.25 inches, at least 0.5 inches, at least 1 inch, or at least 1.5 inches.

According to some embodiments, the length or width of protruding portion 214 of top plate 214 may be smaller than the length or width of aperture 210a at least to provide more access or room for storage within the aperture. Moreover, although shown to be uniform along the length of the plate, the width of the top portion 213 and/or protruding portion 214 of top plate 212 may vary, at least to correspond to any variations in the width of the curb housing.

Each top plate may have the same dimensions, or one or more top plates may have one or more different dimensions. For example, the length of top portion 245 of top plate 244, configured to enclose an aperture 248 corresponding to segment 210, may be determined according to Equation 3.

$$L_{245} = L_{248} + L_{246}/2 + L_{250}/2 \quad \text{Eq. 3}$$

where $L_{245}$ represents the length of top portion 245 of top plate 244, $L_{248}$ represents the length of aperture 248 (not shown in FIG. 2), $L_{246/2}$ represents one-half the length of joint 246, and $L_{250/2}$ represents one-half the length of joint 250 (the region of curb 206 at which segment 210 connects to another segment of the curb).

A different equation may be used to calculate the length of top portion 245 of plate 244 compared to the length of top portion 213 of plate 212 due to segment 209 being at an end of curb 206 and segment 210 being in between two other segments of curb 206.

According to some embodiments, the material with which a top plate is composed can enhance the rigidity and mechanical strength of the top plate. The enhanced rigidity and mechanical strength of the top plate can ensure adequate protection of a power source or a power source connector comprised within a corresponding section of the curb. For example, according to some embodiments, top plate 212 can be composed of concrete, steel, aluminum, and/or copper; steel may be selected based at least on its ability to mitigate rust, its impact resistance, and/or its ductility. According to some embodiments, top plate 212 can be composed of reinforced or hardened steel. All top plates may be composed of the same material, or one or more top plates may be composed of a material other than the material with which top plate 212 is composed (e.g., if one segment of the curb is subject to greater forces).

According to some embodiments, a top plate can be designed to be used for approximately 1 to 5 years before being replaced; the top plate may need to be replaced due to material wear that decreases the rigidity and/or mechanical strength of the plate, such that it can no longer provide adequate protection to the at least one power source or power source connector stored within the corresponding section of the curb.

According to some embodiments, a top plate comprises an indentation configured to electrically couple at least one power outlet to at least one power source or power source connecter stored within a corresponding segment of the curb housing. For example, indentation 216 of top plate 212 can be configured to electrically couple power outlets 220 to at least one power source or power source connector within curb segment 209. As shown in FIG. 2, power outlets 220 may be comprised within a power station 218, and a portion of power station 218 may be configured to fit within indentation 216. Thus, a power source connector (e.g., power cable 232) may be electrically coupled to a power source on one end (e.g., coupled to port 230, which may be in turn coupled to a power line emanating from a power plant), may extend through an aperture of the curb (e.g., aperture 210a), and may be connected to a power outlet (e.g., power outlets 220 comprised within power station 218) on the other end to charge one or more devices plugged into the power outlet (e.g., smart phone 227 plugged into outlet 224 via power cable 226).

According to some embodiments, the dimensions of an indentation may be customized. For example, the length, width, and/or height of indentation 216 may be customized based at least in part on the length, width, and/or height of top plate 216. As shown in FIG. 2, the length of indentation 216 (measured in the direction of the length of curb 206) may be approximately equal to one-fourth the length of the top portion 213 of top plate 212; this may advantageously allow for a plurality of indentations (e.g., both indentation 216 and indentation 234) to be comprised within top plate 212 and spaced apart from each other such that a plurality of power stations (e.g., both power station 218 and power station 236) may be electrically coupled to top plate 212. According to some embodiments, the length of indentation 216 can be at least 4 inches, at least 6 inches, at least 8 inches, at least 10 inches, at least 12 inches, or at least 14 inches.

According to some embodiments, a different power source and/or power source connector may be used to provide power to the different power stations (e.g., power cable 232 may be connected to port 230 and may provide power to power station 218 via indentation 216, and a second data cable (not shown in FIG. 2) may be connected to port 231 and may provide power to power station 236 via indentation 234). According to some embodiments, the same power source and/or power source connector may be used to provide power to different power stations (e.g., power cable 232 may be connected to port 230 and may subsequently be split into two cables, one of which provides power to power station 218 via indentation 216 and the other of which provides power to power station 236 via indentation 234).

As shown in FIG. 2, the width of indentation 216 (measured in the direction of the width of curb 206) may be approximately equal to half the width of top plate 212; reducing the width of indentation 216 to be much less than half the width of top plate 212 may disadvantageously decrease the area by which power station 218 may couple to top plate 212, and increasing the width of indentation 216 to be much more than half the width of top plate 212 may disadvantageously reduce the area by which protruding portion 214 of top plate 212 connects to top portion 213 of top plate 212. According to some embodiments, the width of indentation 216 can be at least 2 inches, at least 4 inches, at least 6 inches, at least 8 inches, or at least 10 inches. According to some embodiments, the depth of indentation 216 (measured in the direction of the height of curb 206) may be at least 0.25 inches, at least 0.5 inches, at least 1 inch, at least 1.5 inches, or at least 2 inches; the depth of indentation 216 may be selected at least to ensure that a portion of power station 218 can be securely attached to top plate 212, but that there can still be room in aperture 210a underneath indentation 216 in which to access or store the at least one power source or power source connector within aperture 210a.

According to some embodiments, an indentation of a top plate can be manufactured via a milling process and/or via one or more stepped-extrusions. Manufacturing an indentation may require specialized tooling. Alternatively, the tooling used to manufacture an indentation may be rapidly reconfigurable, such that a tool may be used to manufacture a wide variety of parts in addition to an indentation of a top plate.

According to some embodiments, a portion of a power station can be removably attached to an indentation of a top plate via a rigid sheet. According to some embodiments, the rigid sheet can be connected to the bottom of the power station (e.g., the side of the power station which is closest to the ground). For example, as shown in FIG. 2, power station 218 can be coupled to indentation 216 via rigid sheet 222. According to some embodiments, the length, width, and depth of a rigid sheet can be configured to approximately match those of a corresponding indentation of a top plate; as shown in FIG. 2, the length, width, and depth of rigid sheet 222 approximately match those of indentation 216. Thus, a top side of a rigid sheet may be flush to a top side of an indentation, which may beneficially limit damage to the rigid sheet.

According to some embodiments, the rigid sheet may be connected to a side (e.g., a left side or a right side) of the power station which extends in a direction perpendicular to the ground. For example, as shown in FIG. 2, rigid sheet 223 can be attached to a side of power station 218. Connecting the rigid sheet to a side of the power station, rather than to the bottom of the power station, may beneficially allow the coupling of the power station to the top plate to occur in a region of the power station which is closer to the power outlets comprised within the power station.

Removably attaching a power station to an indentation of a top plate via a rigid sheet advantageously can provide increased flexibility: if any dimension of the indentation is modified (e.g., if top plate 212 is modified), then the corresponding dimension of the rigid sheet may be modified, rather than modifying any dimension of the power station itself.

According to some embodiments, rigid sheet 222 can be composed of the same material as top portion 213 of top plate 212 (e.g., reinforced steel, concrete, aluminum, and/or copper) to provide the same protection to the at least one power source or power source connector comprised within curb segment 209 as can be provided by top portion 213.

According to some embodiments, rigid sheet 222 can be removably attached to indentation 216 via at least one fastener. A fastener may include any variation of a removable securing device(s), such as nuts and bolts, screws, pins, nails, any combination thereof, and/or the like. As shown in FIG. 2, rigid sheet 222 may be removably connected to indentation 216 via 4 fasteners, each of which is configured to attach a corner of rigid sheet 222 to a corner of indentation 216.

According to some embodiments, a rigid sheet can comprise a port configured to receive a power source connector (e.g., power cable 232). In these embodiments, a power source connector may be electrically coupled to the power source on one end and the power station on the other end. This may advantageously allow power to be transmitted along the shortest path from a power source to power outlets comprised within the power station, thus reducing unnecessary power losses.

According to some embodiments, a portion of each of a plurality of power stations can be removably attached to a respective indentation of a top plate, such that each indentation can be configured to electrically couple a respective power outlet(s) to at least one power source or power source connector comprised within a segment of the curb. According to some embodiments, a portion of each power station is attached to a respective indentation of a top plate via a respective rigid sheet. For example, as shown in FIG. 2, power station 218 is removably attached to indentation 216 via rigid sheet 222 (as explained above) and power station 236 is removably attached to indentation 234 via rigid sheet 240. Power station 218 can comprise power outlets 220, and power station 236 can comprise power outlets 238. One or more devices on a street or sidewalk (e.g., street 202 or sidewalk 204) may be simultaneously plugged into power outlets 220 (e.g., a device may be connected to outlet 224) and plugged into power outlets 236 (e.g., a device may be connected to outlet 242). As discussed above, a different power source and/or power source connector may be used to provide power to the different power stations, or the same power source and/or power source connector may be used to provide power to the different power stations.

According to some embodiments, the curb may comprise a plurality of top plates; each top plate may be configured to removably attach to and fit within an aperture of the curb, enclosing a top portion of a corresponding segment of the curb when attached. According to some embodiments, each top plate comprises at least one indentation configured to electrically couple a power outlet(s) to a power source or power source connector. For example, as shown in FIG. 2, curb 206 comprises top plate 212, configured to fit within aperture 210a and enclose a top portion of segment 209, and top plate 244, configured to fit within aperture 248 and enclose a top portion of segment 210. Moreover, top plate 212 can comprise indentation 216 which can be configured to electrically couple outlets 220 to a power source or power source connector comprised within segment 209 and indentation 234 which can be configured to electrically couple outlets 238 to a power source or power source connector comprised within segment 209; similarly, top plate 244 can comprise indentation 252 and indentation 254, each of which can be configured to electrically couple a respective power outlet (not shown) to a power source or power source connector comprised within segment 210.

The same power source or power source connector may be used to power at least one power outlet electrically coupled to different top plates, or a different power source or power source connector may be used to power at least one power outlet depending on the top plate. It may be advantageous to use the same power source or power source connector to power at least one power outlet electrically coupled to different top plates at least to minimize the amount of storage space taken up within the limited storage space afforded by the curb; this may be particularly important for a curb which is configured to provide power to many power outlets. It may be advantageous to use a different power source or power source connector to power at least one power outlet depending on the top plate at least to (1) reduce the distance through which power is transmitted from a power source to a power outlet (and thus to reduce unnecessary power losses); and/or (2) reduce dependency upon any one power source or power source connector.

According to some embodiments, a top plate can include one or more light sources electrically coupled to at least one power source or power source connector stored within a corresponding segment of the curb. For example, top plate 212 may comprise a light source (e.g., a lightbulb, such as an LED light). A light source comprised within a top plate of a curb may advantageously provide light to pedestrians on a sidewalk and to motor vehicle drivers on a street. According to some embodiments, each top plate comprised within a curb includes at least one light source; according to some embodiments, only one or some of the top plates comprised within a curb includes at least one light source.

A top plate may comprise an aperture in which a portion of a light source can be configured to fit. According to some embodiments, a top plate comprises a plurality of apertures, enabling a plurality of light sources to be attached to the top plate. The aperture(s) may be adjacent to the indentation(s) of the top plate, at least to allow the coupling of the power outlet(s) to the at least one power source or power source connector comprised within the curb, as described above. A light source may be removably attached to the top plate. According to some embodiments, a light source can be removably attached to the top plate via at least one fastener, such as any variation of a removable securing device(s) (e.g., nuts and bolts, screws, pins, nails, any combination thereof, and/or the like). Moreover, a light source may be housed within the top plate, such that a top side of the light source (e.g., the side farthest from the ground) is flush with the top side of the top plate when attached; this may advantageously mitigate any potential damage to the light source.

A light source may be electrically coupled to the same power source and/or power source connector used to power the at least one power outlet, or a light source may be electrically coupled to a different power source and/or power source connector used to power the at least one power outlet. Moreover, each light source may be electrically coupled to the same power source and/or power source connector, or a light source may be electrically coupled to a different power source and/or power source connector compared to another light source.

Although the disclosure has been described with respect to a curb configured to electrically couple at least one power source or power source connector to at least one power outlet, the curb may be configured to electrically and/or communicatively couple other objects. For example, the curb may be configured to electrically and/or communicatively couple at least one data source (e.g., a computer, a database, a web service, an API, any combination thereof, or the like) or data source connector (e.g., a data cable) to at least one data outlet. According to some embodiments, the curb may house the at least one data source or data source connector. For example, some or each of the ports of the curb (e.g., port 230 and/or port 231 of curb 206) may be configured to receive data from a data source, and the curb may house at least one data cable that is configured to receive and transmit data from the at least one data source.

According to some embodiments, the data cable may be an Ethernet cable that provides an Ethernet connection to at least one data outlet (e.g., an Ethernet port) electrically and/or communicatively coupled to the curb, and subsequently to one or more devices (e.g., a phone and/or a computer) electrically coupled to the at least one data outlet. The Ethernet cable may be housed within the curb, connected to at least one data source on one end, and connected to at least one data outlet on the other end. Thus, the curb may advantageously provide an Ethernet connection to one or more devices connected thereto. The Ethernet connection may be advantageous at least to provide a faster, more reliable, and/or more secure internet connection to the one or more devices than would otherwise be achievable (e.g., via WiFi).

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated by reference.

The invention claimed is:

1. A curb for providing electricity to one or more devices on a street or a sidewalk, the curb comprising:
   a rigid curb housing for storing at least one power source or power source connector configured to be electrically coupled to a power source; and
   a top plate removably attached to the rigid curb housing, the top plate comprising:
      a top portion comprising at least one power outlet, wherein the top portion has a width and a length; and
      a protruding portion on an opposite side of the top plate from the top portion, wherein the protruding portion is configured to electrically couple the at least one power outlet of the top portion to the at least one power source or power source connector and the protruding portion is configured to fit within an aperture of the rigid curb housing,
wherein the width of the top portion is greater than a width of the aperture of the rigid curb housing and the length of the top portion is greater than a length of the aperture of the rigid curb housing such that the top portion encloses the rigid curb housing.

2. The curb of claim 1, wherein the rigid curb housing comprises a front side, a back side, and a bottom side.

3. The curb of claim 1, wherein the rigid curb housing comprises at least one aperture on its top side.

4. The curb of claim 3, wherein a longitudinal direction of the at least one aperture extends in a longitudinal direction of the curb.

5. The curb of claim 3, wherein a portion of the top plate is configured to fit within the at least one aperture, such that the top plate encloses a portion of the top side of the rigid curb housing corresponding to the at least one aperture when attached.

6. The curb of claim 5, wherein the top plate is removably attached to the top side of the rigid curb housing via at least one fastener.

7. The curb of claim 1, wherein the top plate comprises at least one indentation configured to electrically couple the at least power outlet to the at least one power source or power source connector.

8. The curb of claim 7, wherein each of the one or more devices is connected to a power outlet included in the at least one power outlet.

9. The curb of claim 7, wherein the at least one power outlet is comprised within a power station.

10. The curb of claim 9, wherein a portion of the power station is configured to fit within the at least one indentation of the top plate.

11. The curb of claim 10, wherein the power station is removably attached to the top plate via at least one fastener.

12. The curb of claim 7, wherein the at least one indentation is configured to electrically couple a respective at least one power outlet to the at least one power source or power source connector.

13. The curb of claim 12, wherein a first indentation is configured to electrically couple at least one first power outlet to a first power source or a first power source connector, and wherein a second indentation is configured to electrically couple at least one second power outlet to a second power source or a second power source connector.

14. The curb of claim 13, wherein the first indentation electrically couples the at least one first power outlet to the first power source via the first power source connector, and wherein the second indentation electrically couples the at least one second power outlet to the second power source via the second power source connector.

15. The curb of claim 1, wherein the top plate comprises a light source.

16. The curb of claim 1, wherein the power source connector comprises a power cable.

17. The curb of claim 1, wherein the housing and the top plate comprise reinforced or hardened steel.

* * * * *